May 25, 1948.　　　C. L. EKSERGIAN　　　2,442,267
SIDE TOWED VEHICLE
Filed Dec. 14, 1944　　　5 Sheets-Sheet 1
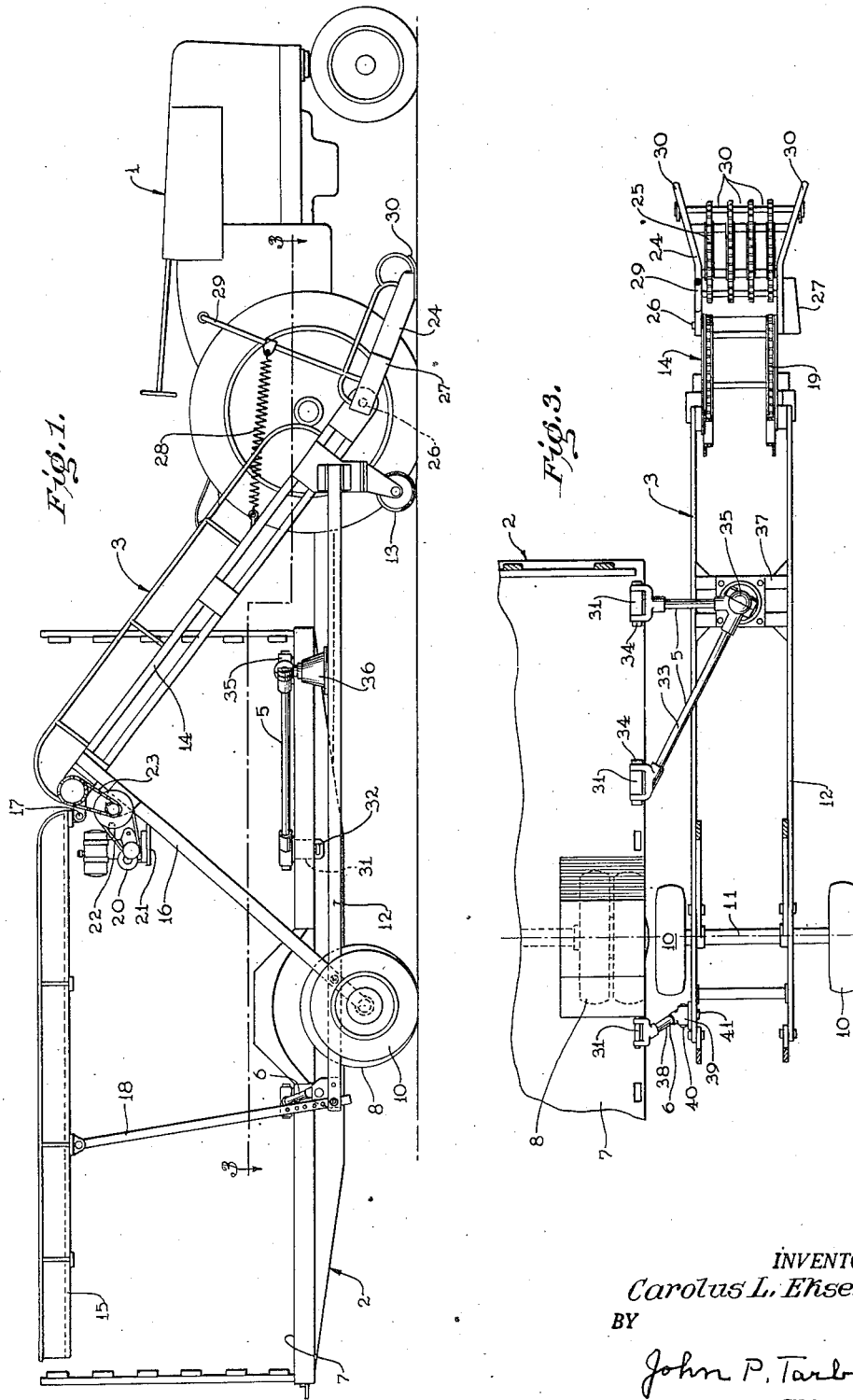
INVENTOR.
Carolus L. Eksergian
BY
John P. Tarbox
ATTORNEY May 25, 1948. C. L. EKSERGIAN 2,442,267
SIDE TOWED VEHICLE
Filed Dec. 14, 1944 5 Sheets-Sheet 2
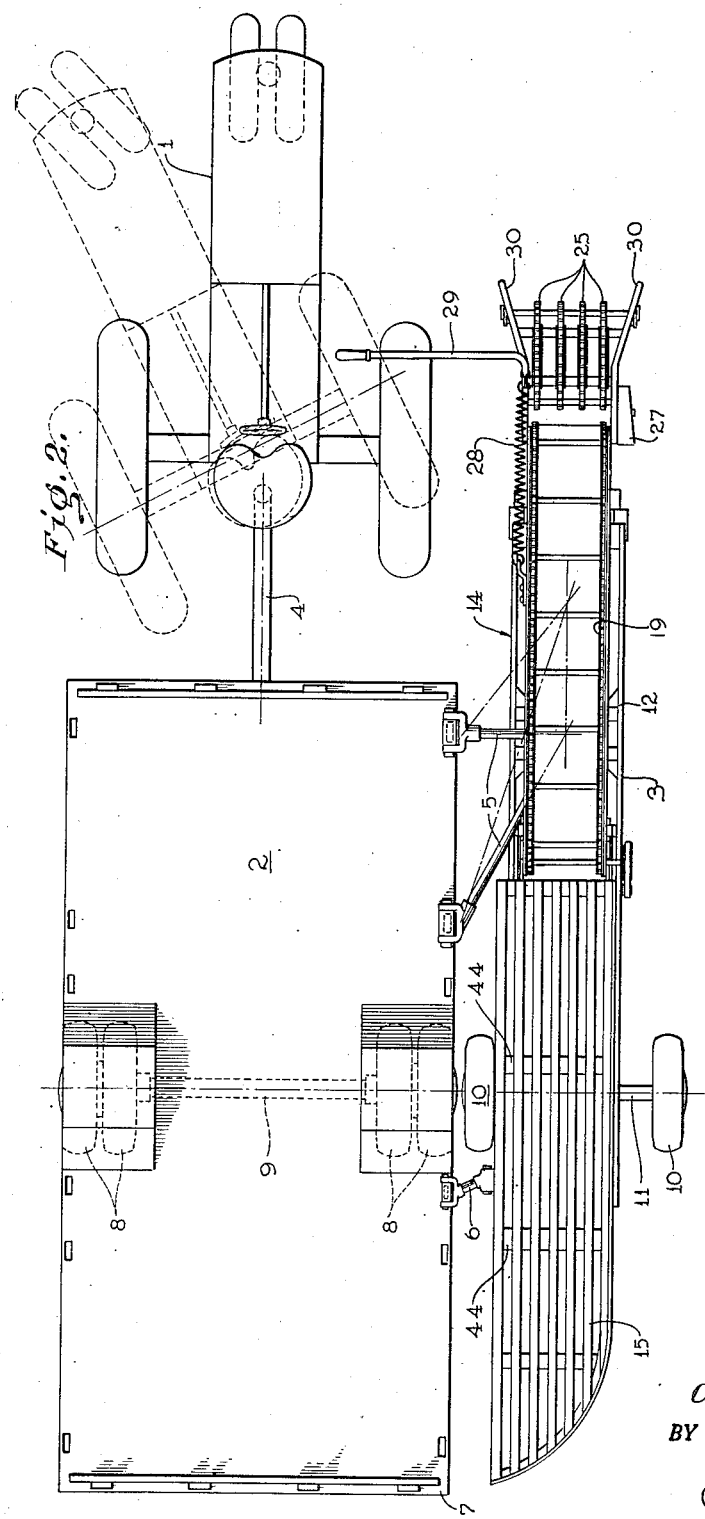
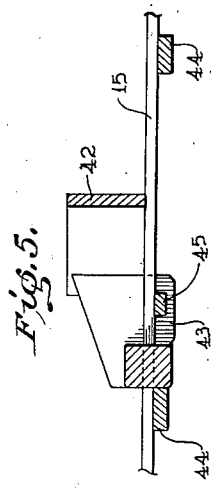
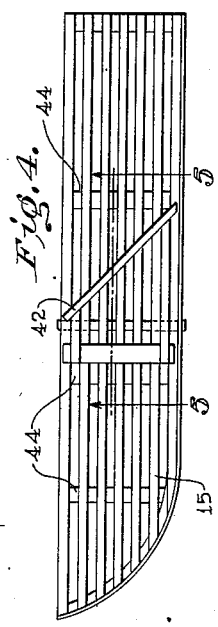
INVENTOR.
*Carolus L. Eksergian*
BY
*John P. Tarbox*
ATTORNEY May 25, 1948. C. L. EKSERGIAN 2,442,267
SIDE TOWED VEHICLE
Filed Dec. 14, 1944 5 Sheets-Sheet 3
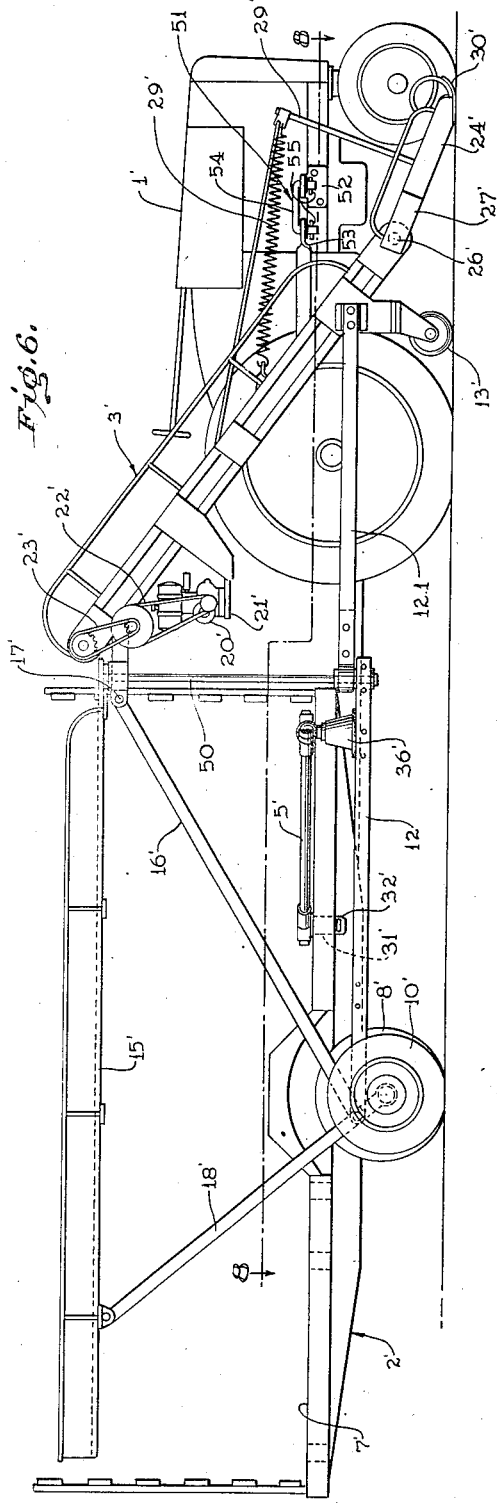
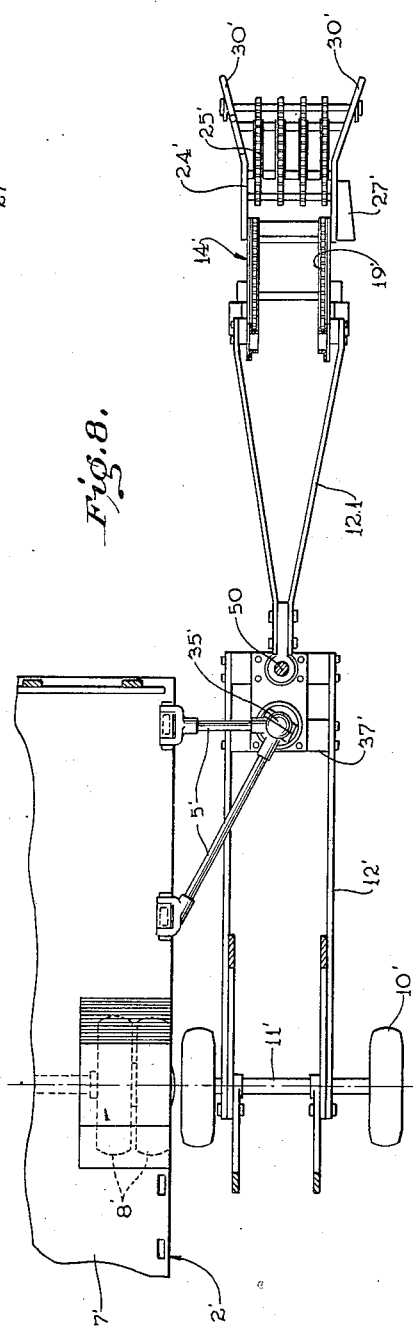
INVENTOR.
Carolus L. Eksergian
BY John P. Tarbox
ATTORNEY

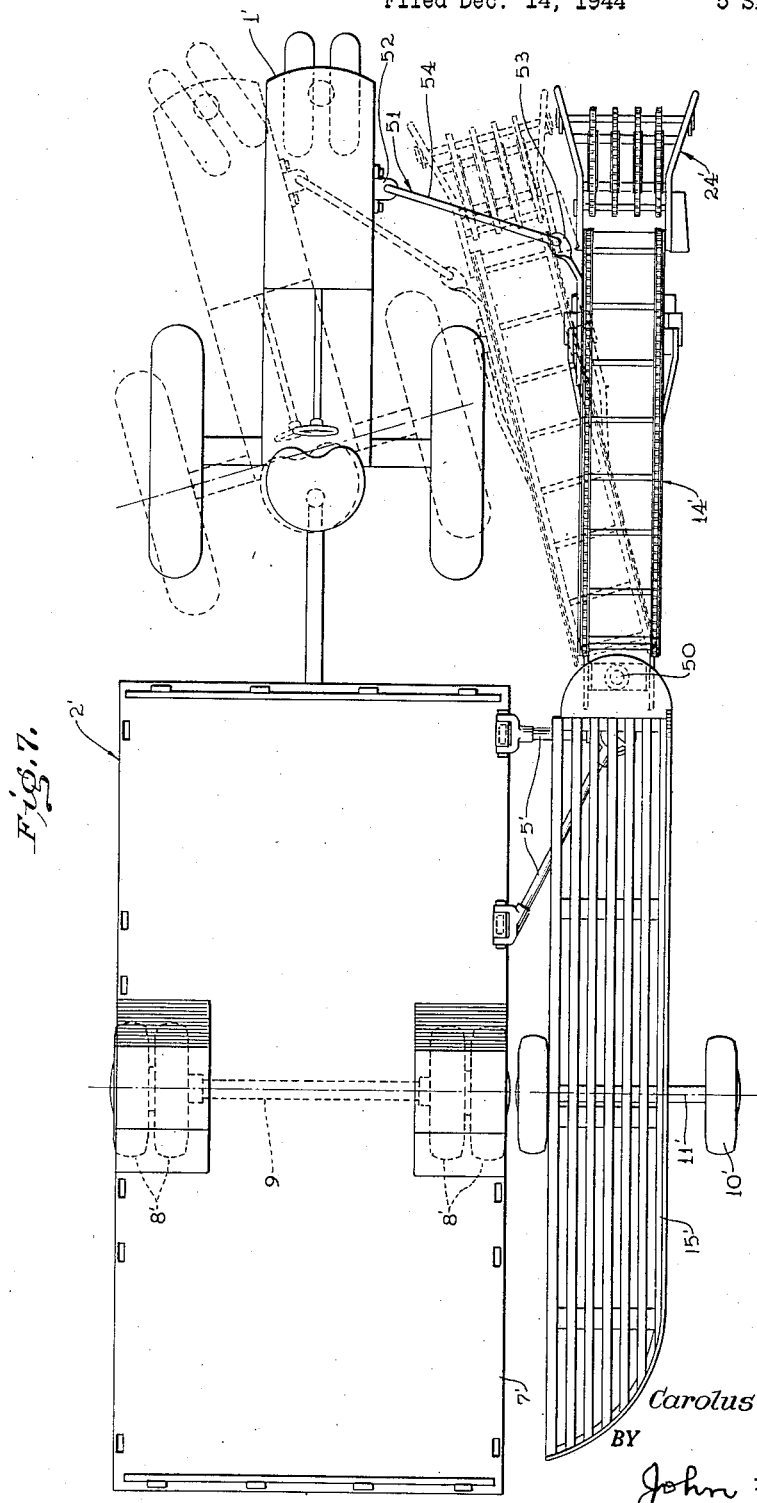

May 25, 1948.    C. L. EKSERGIAN    2,442,267
SIDE TOWED VEHICLE
Filed Dec. 14, 1944    5 Sheets-Sheet 5

INVENTOR
Carolus L. Eksergian

BY
*[signature]*
ATTORNEY

Patented May 25, 1948

2,442,267

UNITED STATES PATENT OFFICE 2,442,267

SIDE-TOWED VEHICLE

Carolus L. Eksergian, Detroit, Mich., assignor to The Budd Company, Philadelphia, Pa., a corporation of Pennsylvania Application December 14, 1944, Serial No. 568,096

6 Claims. (Cl. 280—33.44)

This invention relates to side-towed vehicles, particularly to conveyor-type bale loaders, and has for an object the provision of improvements in this art.

One of the particular objects of the invention is to provide an improved wheel arrangement of a side-towed vehicle relative to the towing vehicle, whereby easy turning movement is effected without side scraping of any of the wheels on the ground.

Another object is to provide an improved hitch for a side-towed vehicle.

Another object is to provide an improved delivery device for a conveyor, whereby material may be selectively delivered at any point along the length of a load receiving body.

Another object is to provide an improved hitch for a pivoted conveyor section.

The above and other objects and various features of the invention will be apparent from the following description of an exemplary embodiment, reference being made to the accompanying drawings, wherein:

Fig. 1 is a side elevation of a tractor-trailer-loader assembly embodying the invention;

Fig. 2 is a top plan view of the apparatus shown in Fig. 1;

Fig. 3 is a partial horizontal section taken on the line 3—3 of Fig. 1;

Fig. 4 is a plan view of the delivery platform with a throw-off board installed;

Fig. 5 is a vertical section taken on the line 5—5 of Fig. 4;

Fig. 6 is a side view of a modification;

Fig. 7 is a plan view of the apparatus shown in Fig. 6;

Fig. 8 is a partial horizonal section taken on the line 8—8 of Fig. 6; and

Figure 9:
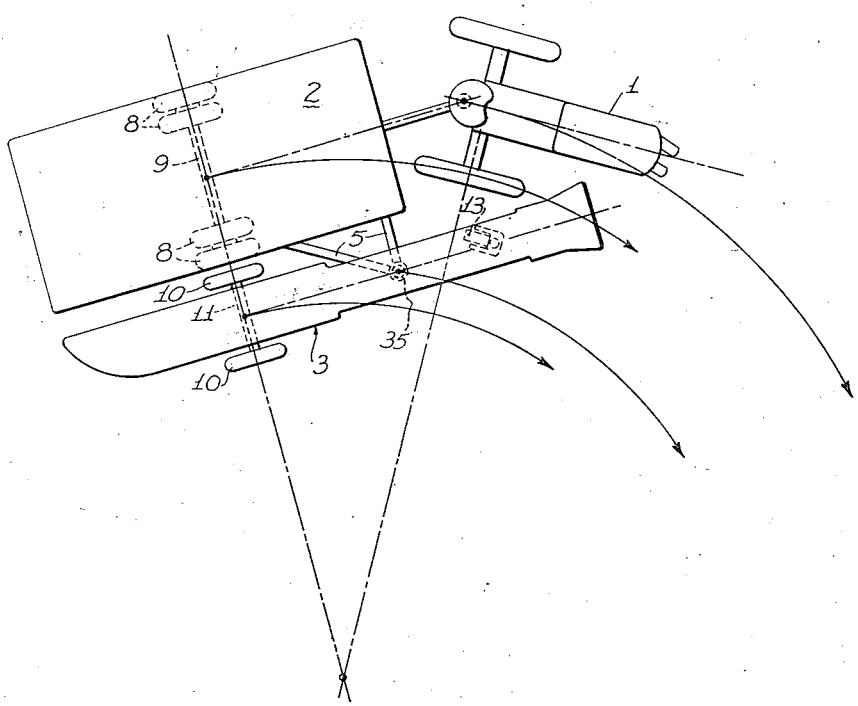
Fig. 9 is a diagrammatic plan view to show the turning movements of the vehicles.

Referring first to Figs. 1 to 5, the apparatus illustrated comprises a powered towing device, such as a tractor 1, a material transporting device, such as a trailer 2, and a side-towed device, such as the conveyor loader 3. The tractor is connected to the trailer by a hitch 4, and the loader is connected to the trailer by a main hitch 5 and a second hitch 6. The hitch 4 comprises a member hinged to turn about a horizontal axis at its rear end and having turning movement about a longitudinal axis and a vertical aixs at the front end. The hitch 5 is connected to the loader near its forward end and may be connected nearer as shown in dotted lines in Fig. 2. The hitch 6 is employed as an auxiliary connection and when the hitch 5 is connected sufficiently well forward to prevent the front end of the loader from pulling out of line on rough ground, the hitch 6 may be omitted. The trailer is representative of any load carrying vehicle and the tractor is representative of any power traction means.

In place of both vehicles, a self-powered truck might be used, or an animal drawn wagon might be used. An essential point is that the material transporting or towing vehicle shall comprise a material receiving body 7 and wheels 8 mounted to turn on a fixed transverse axis, specifically here a rigid transverse shaft or axle 9. The loader comprises wheels 10 mounted on a fixed transvers axis, specifically at shaft 11 which is substantially in transverse alignment with the shaft 9. That is, the shafts 9 and 11 are disposed in the same transverse vertical plane so that none of the wheels will skid on the ground in turning. The shaft 11 is carried from a frame or chassis 12 which at its front end is mounted on one or more caster wheels 13.

Upon the chassis 12 there is mounted a belt-type conveyor 14 and a loading platform 15. The lower front end of the conveyor frame may be secured directly to the chassis, and the upper rear end may be mounted on struts 16 which near the lower end are attached to the chassis and carry the axle 11. The platform 15 at its front end is mounted on the conveyor frame, as by pins 17, and toward its rear end is mounted on adjustable struts 18.

The conveyor belt 19 which includes side chains and cross bars, is driven by any suitable means, such as a motor 20 mounted on a bracket 21 carried by the struts 16. The drive connection may include a belt 22, chain 23 and suitable pulleys and sprockets.

A pick-up conveyor 24 is pivotally mounted on the lower end of the frame of the main conveyor 14. It includes conveyor belts or chains 25 driven from the lower sprocket shaft 26 by suitable interconnecting means housed in a casing 27. The weight of the front end of the pick-up conveyor is substantially balanced by a spring 28 and may be pushed down by a handle 29. Inclined guards 30 across the width and at each side cause the front end of the pivoted conveyor section to rise when a ground obstruction is encountered. The side guards may be angled as far as necessary to the side to prevent injury by side movement in turning.

The side hitches 5 and 6 are designed to take up all possible movement without binding and are also designed to be very quickly installed and removed. The front hitch 5 includes two depending projections or posts 31 adapted to be inserted in stake loops or sockets in the side of the trailer; and the rear hitch 6 includes a similar depending projection 31 adapted to be inserted in a stake loop. All of the projections 31 may be retained in their loop sockets by retaining pins 32 if necessary.

The front hitch 5 comprises two rigid bars 33 attached by hinge pins 34 to the projections or posts 31, the bars 33 at their other ends being joined in a fitting 35 of a universal connection 36 at the center of the width of the loader frame. The connection is mounted on a cross frame 37.

The rear hitch 6 comprises a rigid bar 38 attached by a hinge pin 34 to the projection post 31, the bar at its other end being connected to a fitting 39 on the side of the loader frame by a pin 40. Movement about another axis may also be provided here if required, as by connecting the fitting 39 to the side of the loader frame by a horizontal pin 41.

In operation, as for loading bales of hay, the three connected vehicles are moved along until the pick-up conveyor engages the end of a bale and runs under it and picks it up. The operation of the pick-up conveyor is explained in more detail in the application of Eksergian et al., Serial No. 560,447, filed October 26, 1944, now Patent No. 2,427,324, dated September 9, 1947, assigned to a common assignee. The bales are carried up the main conveyor 14 and delivered on the platform 15. This is at such height that a person may pull the bales off with a hook or by hand and stack them on the trailer body. Or, if the bales are not taken off the platform immediately, they will accumulate and be pushed off at the inclined rear end. If it is desired that they be pushed off sooner, an inclined throw-off board 42 may be secured at any desired position along the platform. In the form illustrated, it has depending projections 43 which are adapted to be inserted between the slats of the platform in front of one of the cross bars 44. If needed, pins 45 may be inserted through the projections 43 to retain them in position.

In the embodiment shown in Figs. 6 to 8, the parts are the same as before and are indicated by the same reference characters with a prime, except that the platform 15' is longer and the conveyor 14' is hinged as by a post 50 to the front end of the platform and the frame 12'. In a sense, the frame is divided, the front part 12.1 being used for conveyor.

The hinged conveyor 14', together with its pick-up conveyor 24' is kept in general parallelism with the tractor by a side hitch 51 which includes a fitting 52 on the side of the tractor, a fitting 53 on the side of the conveyor, and a rigid bar 54 connected for universal movement between the fittings. Depending ends on the bar 54 secured in oversized holes in the fittings may provide this universal movement. Pins 55 serve to retain the bar ends in the fittings.

This connection with the hinged conveyor, together with the transverse alignment of the trailer and loader wheels causes all of the connected vehicles to operate smoothly without side drag on any of the wheels. Should the loader be mounted alongside the tractor or a truck, or a wagon instead of alongside the trailer, its rear wheels would be mounted in transaxial alignment with the rear wheels of the tractor or truck, and the hitches 5, 6 would be used with suitable adaptation to connect to the side of the vehicle used for towing.

It is thus seen that the invention provides improved loading and transporting apparatus wherein the units can be quickly connected, will operate smoothly and will load effectively.

While two illustrative embodiments have been described, it is to be understood that there may be various embodiments within the limits of the prior art and the scope of the subjoined claims.

What is claimed is:

1. Apparatus of the character described, comprising in combination, a first wheeled vehicle, a second wheeled vehicle disposed alongside said first vehicle, supporting wheels for said vehicles mounted to turn about transverse axes which for the two vehicles are substantially in alignment in a common vertical plane, and towing connections for one of said vehicles ahead of said wheel axes in the direction of movement, said towing connection including a rigid laterally extending member maintaining the towed vehicle at a fixed distance from the side of the other vehicle and said member having a joint with parts turnable about a vertical axis to provide free horizontal swinging movement of the towed vehicle separately on its towing center and with the wheel axes of both vehicles directed toward a common center of turning, and the towed vehicle being free from all other connections which would restrict said free horizontal swinging movement whereby the vehicles move along concentric circles about a common center when turning.

2. Apparatus of the character described, comprising in combination, a first wheeled vehicle and a second wheeled vehicle each mounted on laterally spaced wheels on a transverse axis, the wheel axes of the two vehicles being substantially in alignment, draft connections for a towed one of the vehicles ahead of and intermediate the length of its wheel axis, said draft connections including a joint with parts turnable about a vertical axis to provide said free horizontal swinging movement of the vehicle separately on its draft connection center and with the wheel axes of both vehicles directed toward a common center of turning, and the towed vehicle being free from all other connections which would restrict said free horizontal swinging movement whereby the wheels of the vehicles move along concentric circles about a common center when turning.

3. Apparatus of the character described, comprising in combination, a first wheeled vehicle and a second wheeled vehicle each mounted on laterally spaced wheels on a transverse axis, the wheel axes of the two vehicles being substantially in alignment, draft connections for one of the vehicles ahead of and intermediate the length of its wheel axis providing free horizontal swinging movement of the vehicle separately on its draft connection center and with the wheel axes of both vehicles directed toward a common center of turning, whereby the wheels of the vehicles move along concentric circles about a common center when turning, the towed vehicle being towed by the other said vehicle, having its draft connection in approximately its central longitudinal axis, and said draft connection providing swinging movement of the towed vehicle about transverse and longitudinal axes in a horizontal plane as well as about a vertical axis for the aforesaid horizontal swinging movement.

4. Apparatus of the character described, comprising in combination, a first or tractor vehicle, a second vehicle hitched behind the first vehicle, a third vehicle hitched alongside the second vehicle, a towing hitch between the third vehicle and one of the other vehicles, said third vehicle including a front portion ahead of its towing hitch disposed alongside the first vehicle hinged to turn relative to the rear portion of the third vehicle about a vertical axis at its rear end, and a hitch between the hinged front portion of the third vehicle and the first vehicle.

5. Apparatus of the character described, comprising in combination, a first or tractor vehicle, a second vehicle hitched behind the first, a third vehicle hitched to and towed from the side of the second vehicle, a towing hitch between the third vehicle and the second, said third vehicle including a front portion ahead of its towing hitch disposed alongside the first vehicle hinged to turn relative to the rear portion of the third vehicle about a vertical axis at its rear end, and a hitch between the hinged front portion of the third vehicle and the first vehicle, said hitch including a rigid member and connections to both vehicles, the member being hinged to turn about vertical axes at each end.

6. Apparatus of the character described, comprising in combination, a tractor, a trailer hitched behind said tractor, a loader having a side hitch to the side of the trailer, the side hitch including fore and aft posts disposed in sockets in the side of the trailer and a bar connected to a post by a horizontal longitudinal axis hinge at one end and connected by a universal joint to the loader at the other end, said trailer and loader including supporting wheels mounted on transverse axes which are approximately in alignment, said loader including an inclined conveyor hinged thereto to turn about a vertical axis at the front end of the trailer and having a caster wheel support near its front end, and a rigid hinge-connected bar hitch between the front end of the conveyor and the front end of the tractor.

CAROLUS L. EKSERGIAN.

REFERENCES CITED

The following references are of record in the file of this patent:

UNITED STATES PATENTS

| Number | Name | Date |
|---|---|---|
| 1,332,495 | Graham | Mar. 2, 1920 |
| 1,413,575 | Cochran | Apr. 25, 1922 |
| 1,478,482 | Marriott et al. | Dec. 25, 1923 |
| 2,021,840 | Ellis et al. | Nov. 19, 1935 |
| 2,174,605 | Spencer | Oct. 3, 1939 |
| 2,255,281 | Dort | Sept. 9, 1941 |
| 2,327,494 | Brown | Aug. 24, 1943 |
| 2,335,942 | Hyman | Dec. 7, 1943 |